United States Patent
Cao et al.

(10) Patent No.: US 12,172,637 B2
(45) Date of Patent: Dec. 24, 2024

(54) MOVING TRACK PREDICTION METHOD AND APPARATUS

(71) Applicant: Huawei Technologies Co., Ltd., Shenzhen (CN)

(72) Inventors: Tongtong Cao, Beijing (CN); Yalin Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 17/585,802

(22) Filed: Jan. 27, 2022

(65) Prior Publication Data

US 2022/0144265 A1    May 12, 2022

Related U.S. Application Data (63) Continuation of application No. PCT/CN2020/081894, filed on Mar. 28, 2020.

(30) Foreign Application Priority Data

Jul. 27, 2019   (CN) .......................... 201910685546.8

(51) Int. Cl.
*B60W 30/10*       (2006.01)
*B60W 50/00*       (2006.01)
(Continued)

(52) U.S. Cl.
CPC ........ *B60W 30/10* (2013.01); *B60W 50/0097* (2013.01); *G05B 17/02* (2013.01);
(Continued)

(58) Field of Classification Search
None
See application file for complete search history.

(56) References Cited

U.S. PATENT DOCUMENTS

| | | | |
|---|---|---|---|
| 9,248,834 B1 | 2/2016 | Ferguson et al. | |
| 11,708,093 B2* | 7/2023 | Siebert ............... | G01C 21/3407 701/25 |

(Continued)

FOREIGN PATENT DOCUMENTS

| | | |
|---|---|---|
| CN | 104808679 A | 7/2015 |
| CN | 105549597 A | 5/2016 |

(Continued)

OTHER PUBLICATIONS

SeongHyeon Park et al., "Sequence-to-Sequence Prediction of Vehicle Trajectory via LSTM Encoder-Decoder Architecture," Feb. 18, 2018, 7 pages.

(Continued)

*Primary Examiner* — Jaime Figueroa
*Assistant Examiner* — Atticus A Cameron
(74) *Attorney, Agent, or Firm* — Conley Rose, P.C.

(57) ABSTRACT

A moving track prediction method includes obtaining an initial state, of a moving target that includes an initial location and an initial motion state, generating one or more destination states of the moving target based on the initial state of the moving target and preset path information, and predicting a moving track of the moving target based on the initial state of the moving target and the one or more destination states to obtain one or more predicted moving tracks.

20 Claims, 5 Drawing Sheets

(51) Int. Cl.

| | |
|---|---|
| *B60W 60/00* | (2020.01) |
| *G01S 13/72* | (2006.01) |
| *G01S 13/931* | (2020.01) |
| *G01S 17/931* | (2020.01) |
| *G05B 17/02* | (2006.01) |
| *G05B 23/02* | (2006.01) |
| *G05D 1/00* | (2024.01) |
| *G06V 20/56* | (2022.01) |
| *G06V 20/58* | (2022.01) |
| *G08G 1/01* | (2006.01) |
| *G08G 1/04* | (2006.01) |

(52) U.S. Cl.
CPC ........... *G05B 23/02* (2013.01); *G05D 1/0212* (2013.01); *B60W 2050/0031* (2013.01); *B60W 2520/105* (2013.01); *B60W 2552/30* (2020.02)

(56) References Cited

U.S. PATENT DOCUMENTS

| | | |
|---|---|---|
| 2013/0238181 A1 | 9/2013 | James |
| 2016/0091897 A1* | 3/2016 | Nilsson ........... B60W 30/18159 701/25 |
| 2017/0210378 A1 | 7/2017 | Gunaratne |
| 2018/0074505 A1 | 3/2018 | Lv et al. |
| 2018/0173240 A1 | 6/2018 | Fang et al. |
| 2018/0257660 A1 | 9/2018 | Ibrahim et al. |
| 2019/0155290 A1 | 5/2019 | Luo |
| 2019/0176818 A1 | 6/2019 | Movert et al. |
| 2020/0050214 A1* | 2/2020 | Goehl .................. G06V 20/584 |
| 2020/0265710 A1 | 8/2020 | Zhan et al. |
| 2020/0298878 A1 | 9/2020 | Lucet et al. |

FOREIGN PATENT DOCUMENTS

| | | |
|---|---|---|
| CN | 106774327 A | 5/2017 |
| CN | 106864361 A | 6/2017 |
| CN | 107168342 A | 9/2017 |
| CN | 108475057 A | 8/2018 |
| CN | 109059944 A | 12/2018 |
| CN | 109496288 A | 3/2019 |
| CN | 109583151 A | 4/2019 |
| CN | 109885066 A | 6/2019 |
| CN | 109976355 A | 7/2019 |
| FR | 3072069 A1 | 4/2019 |
| WO | 2014206654 A1 | 12/2014 |

OTHER PUBLICATIONS

Chen Huiyan et al.,"Vehicle Information Technology," Beijing Institute of Technology Press, Dec. 2013, Version: 1, with an English abstract, 17 pages.

* cited by examiner

MOVING TRACK PREDICTION METHOD AND APPARATUS

CROSS-REFERENCE TO RELATED APPLICATIONS

This is a continuation of International Patent Application No. PCT/CN2020/081894 filed on Mar. 28, 2020, which claims priority to Chinese Patent Application No. 201910685546.8 filed on Jul. 27, 2019. The disclosures of the aforementioned applications are hereby incorporated by reference in their entireties.

TECHNICAL FIELD

The present disclosure relates to moving track prediction technologies, and in particular, to a moving track prediction method and apparatus.

BACKGROUND

An intelligent driving system usually includes a sensing module, a positioning module, a planning and control module, and the like. The sensing module is configured to sense surroundings of a vehicle. The positioning module is configured to determine a location of the vehicle. The planning and control module is configured to plan and control a path of an intelligent driving vehicle with reference to a sensing result of the sensing module and a positioning result of the positioning module. In a vehicle controlling process, the intelligent driving vehicle not only needs to sufficiently sense the surroundings of the vehicle, but also needs to foreknow a future track change of the vehicle, to avoid a possible collision. Track prediction of a target is usually performed by the planning and control module, and is to predict a future track of the target based on a sensing result of the target. Correct track prediction can provide important reference information for path planning of the planning and control module.

Figure 1:
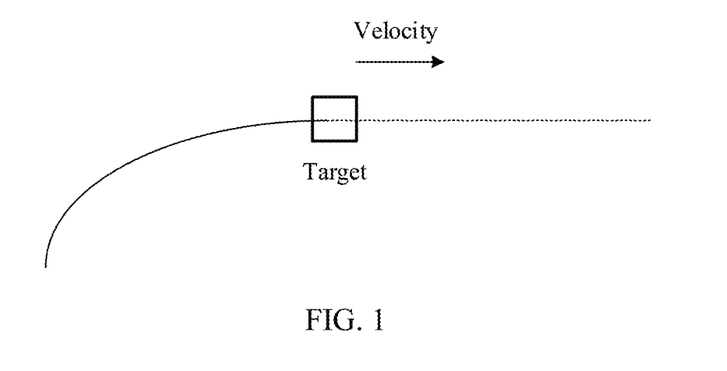
FIG. 1 is a schematic diagram of a moving track prediction method in the other approaches.

In the other approaches, generally, track prediction is performed based on a location and a velocity of a target by using a kinematic model (for example, a constant velocity, constant acceleration, or a constant angular velocity). As shown in FIG. 1, a solid line represents a historical track of a target, and a dashed line represents a predicted track obtained through deduction based on a location and a velocity that are of the target at a current moment. Because the target does not continue to move completely based on an original motion feature, especially when future motion of the target is adjusted based on a road structure, there is a relatively large deviation when track prediction is performed by using the other approaches.

SUMMARY

For a technical problem in the other approaches that moving track prediction precision is low, embodiments of the present disclosure provide a moving track prediction method and apparatus, to improve moving track prediction precision.

The embodiments of the present disclosure may be applied to an intelligent driving system including automated driving and assisted driving, and the target not only may be a target vehicle, but also may be a pedestrian, a rider, a robot, or another moving target.

According to a first aspect, a moving track prediction method is provided, including obtaining an initial state of a target, where the initial state includes an initial location and an initial motion state, generating one or more destination states of the target based on the initial state and preset path information, where the destination state includes at least a destination location, and predicting a moving track of the target based on the initial state and the destination state, to obtain one or more predicted moving tracks. The preset path information in a form of a road structure, a road sign indication, a map, or the like is introduced, so that the predicted track of the target is limited by the preset path information, and better conforms to an actual moving scenario of a moving target especially a target vehicle compared with a track predicted only by using the initial state of the target. This can greatly improve moving track prediction precision. In addition, a long-time (for example, 10 seconds) track can be predicted.

According to the first aspect, in a first possible implementation of the moving track prediction method, generating one or more destination states of the target based on the initial state and preset path information includes determining, based on the initial location and the preset path information, one or more preset paths associated with the target, and generating the one or more destination states based on the initial state and a motion model, where the one or more destination states correspond to the one or more preset paths. The preset path associated with the target is determined, helping to associate the initial state of the target with the preset path information, to obtain a destination state associated with the preset path information. The determined preset path associated with the target may be a preset path closest to the target, or may be a plurality of preset paths close to the target.

According to the first aspect or the first possible implementation of the first aspect, in a second possible implementation of the moving track prediction method, generating the one or more destination states based on the initial state and a motion model includes establishing one or more Frenet coordinate systems based on the one or more preset paths, and generating the one or more destination states respectively in the one or more Frenet coordinate systems based on the initial state of the target and the motion model. The Frenet coordinate system is established based on the preset path associated with the target, helping to apply the motion model to the preset path associated with the target, for calculation.

According to any one of the first aspect or the implementations of the first aspect, in a third possible implementation of the moving track prediction method, the one or more predicted moving tracks are moving tracks in the one or more Frenet coordinate systems, and the method further includes transforming the one or more predicted moving tracks for use in a coordinate system used to plan and control motion of a target. The predicted moving track is transformed from the Frenet coordinate system to the coordinate system used to plan and control motion of a target, helping to apply a moving track prediction result of the target to a motion planning and control module.

According to any one of the first aspect or the implementations of the first aspect, in a fourth possible implementation of the moving track prediction method, the coordinate system used to plan and control motion of a target includes a vehicle coordinate system, a topocentric coordinate system, or a world coordinate system.

According to any one of the first aspect or the implementations of the first aspect, in a fifth possible implementation of the moving track prediction method, generating one or more destination states of the target based on the initial state and preset path information includes generating the one or more destination states of the target based on the initial state, the preset path information, and a parameter that is obtained after model training. A degree of matching between the destination states generated by using the parameter obtained after model training and an actual motion feature of the target is higher, and track prediction is more accurate.

According to any one of the first aspect or the implementations of the first aspect, in a sixth possible implementation of the moving track prediction method, when there are a plurality of destination states, the method further includes generating a probability of each of the plurality of destination states based on the initial state of the target and the preset path information, where the probability of each destination state is used to obtain a probability of each of the plurality of predicted moving tracks. There may be a plurality of next possible moving tracks of the target in an actual moving environment. Probability calculation is introduced, helping to better determine a possible choice of the target, thereby further improving moving track prediction precision.

According to any one of the first aspect or the implementations of the first aspect, in a seventh possible implementation of the moving track prediction method, predicting a moving track of the target based on the initial state and the one or more destination states, to obtain one or more predicted moving tracks includes predicting a moving track of the target based on the initial state and a destination state having a highest probability, to obtain a predicted moving track having a highest probability.

According to any one of the first aspect or the implementations of the first aspect, in an eighth possible implementation of the moving track prediction method, the destination state further includes a destination motion state, and the destination motion state includes at least one of a velocity, acceleration, an angular velocity, or angular acceleration. Moving track prediction is performed with reference to the destination location and the destination motion state, so that prediction precision can be further improved.

According to any one of the first aspect or the implementations of the first aspect, in a ninth possible implementation of the moving track prediction method, the initial motion state includes at least one of a velocity, acceleration, an angular velocity, or angular acceleration.

According to any one of the first aspect or the implementations of the first aspect, in a tenth possible implementation of the moving track prediction method, the initial state of the target and the preset path information are based on a same coordinate system, and obtaining an initial state of a target includes obtaining a sensing result of the target from one or more sensors, and projecting the sensing result of the target onto the same coordinate system to obtain the initial state of the target. The result output by the sensor and the preset path information usually are based on different coordinate systems, and are enabled to correspond to the same coordinate system through a projection operation. This helps to generate the destination state of the target with reference to the result and the preset path information in a subsequent operation.

According to any one of the first aspect or the implementations of the first aspect, in an eleventh possible implementation of the moving track prediction method, the sensing result of the target is based on a sensor coordinate system or a vehicle coordinate system, and the same coordinate system is a topocentric coordinate system or a world coordinate system.

According to a second aspect, a moving track prediction apparatus is provided, including an initial state obtaining module configured to obtain an initial state of a target, where the initial state includes an initial location and an initial motion state, a destination state generation module configured to generate one or more destination states of the target based on the initial state and preset path information, where the destination state includes at least a destination location, and a moving track prediction module configured to predict a moving track of the target based on the initial state and the destination state, to obtain one or more predicted moving tracks.

According to the second aspect, in a first possible implementation of the moving track prediction apparatus, the destination state generation module includes an associated path determining module configured to determine, based on the initial location and the preset path information, one or more preset paths associated with the target, and a model calculation module configured to generate the one or more destination states based on the initial state and a motion model, where the one or more destination states correspond to the one or more preset paths.

According to the second aspect or the first possible implementation of the second aspect, in a second possible implementation of the moving track prediction apparatus, the model calculation module includes a coordinate system establishment module configured to establish one or more Frenet coordinate systems based on the one or more preset paths, and the one or more destination states are generated by the model calculation module respectively in the one or more Frenet coordinate systems based on the initial state of the target and the motion model.

According to any one of the second aspect or the implementations of the second aspect, in a third possible implementation of the moving track prediction apparatus, the one or more predicted moving tracks are moving tracks in the one or more Frenet coordinate systems, and the apparatus further includes a coordinate system transformation module configured to transform the one or more predicted moving tracks for use in a coordinate system used to plan and control motion of a target.

According to any one of the second aspect or the implementations of the second aspect, in a fourth possible implementation of the moving track prediction apparatus, the coordinate system used to plan and control motion of a target includes a vehicle coordinate system, a topocentric coordinate system, or a world coordinate system.

According to any one of the second aspect or the implementations of the second aspect, in a fifth possible implementation of the moving track prediction apparatus, generating one or more destination states of the target based on the initial state and preset path information includes generating the one or more destination states of the target based on the initial state, the preset path information, and a parameter that is obtained after model training.

According to any one of the second aspect or the implementations of the second aspect, in a sixth possible implementation of the moving track prediction apparatus, the destination state generation module includes a probability calculation module configured to, when there are a plurality of destination states, generate a probability of each of the plurality of destination states based on the initial state of the target and the preset path information, where the probability of each destination state is used to obtain a probability of each of the plurality of predicted moving tracks.

According to any one of the second aspect or the implementations of the second aspect, in a seventh possible implementation of the moving track prediction apparatus, predicting a moving track of the target based on the initial state and the one or more destination states, to obtain one or more predicted moving tracks includes predicting a moving track of the target based on the initial state and a destination state having a highest probability, to obtain a predicted moving track having a highest probability.

According to any one of the second aspect or the implementations of the second aspect, in an eighth possible implementation of the moving track prediction apparatus, the destination state further includes a destination motion state, and the destination motion state includes at least one of a velocity, acceleration, an angular velocity, or angular acceleration.

According to any one of the second aspect or the implementations of the second aspect, in a ninth possible implementation of the moving track prediction apparatus, the initial motion state includes at least one of a velocity, acceleration, an angular velocity, or angular acceleration.

According to any one of the second aspect or the implementations of the second aspect, in a tenth possible implementation of the moving track prediction apparatus, the initial state of the target and the preset path information are based on a same coordinate system, and obtaining an initial state of a target includes obtaining a sensing result of the target from one or more sensors, and projecting the sensing result of the target onto the same coordinate system to obtain the initial state of the target. The result output by the sensor and the preset path information usually are based on different coordinate systems, and are enabled to correspond to the same coordinate system through a projection operation. This helps to generate the destination state of the target with reference to the result and the preset path information in a subsequent operation.

According to any one of the second aspect or the implementations of the second aspect, in an eleventh possible implementation of the moving track prediction apparatus, the sensing result of the target is based on a sensor coordinate system or a vehicle coordinate system, and the same coordinate system is a topocentric coordinate system or a world coordinate system.

According to a third aspect, a moving track prediction apparatus is provided, including a memory and a processor. The memory stores a computer program instruction, and the processor runs the computer program instruction to perform the method according to any one of claims 1 to 8.

According to a fourth aspect, a computer storage medium is provided, including a computer instruction. When the computer instruction is run by a processor, the moving track prediction apparatus is enabled to perform the method according to any one of claims 1 to 8.

According to a fifth aspect, a computer program product is provided. When the computer program product is run on a processor, the moving track prediction apparatus is enabled to perform the method according to any one of claims 1 to 8.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For both an advanced driver-assistance system (ADAS) and an automated driving system, one important work is to calculate a location of the system and a relative location relationship or speed relationship between the system and a traffic element such as a road, a vehicle, or a pedestrian. To describe the complex spatial relationships, a spatial coordinate system needs to be established, and this is a precondition of implementing various environmental sensing and decision planning algorithms. First, several coordinate systems used in the embodiments of the present disclosure are described as follows.

A sensor coordinate system is a coordinate system on which a sensing result of each sensor is based. Coordinate systems used by the sensors may be different based on different types or installation locations of the sensors.

A vehicle coordinate system is used to describe a relative location relationship between an object near a vehicle and the vehicle. Three perpendicular coordinate axes are respectively a length direction, a width direction, and a height direction of the vehicle. Several common vehicle coordinate system defining manners in the academia and the industry are respectively definition based on an International Organization for Standardization (ISO) international standard, definition based on the Society of Automotive Engineers (SAE), and coordinate definition based on an inertial measurement unit (IMU).

A topocentric coordinate system is also referred to as east, north, and up (ENU) coordinate system, north, east, and up (NEU) coordinate system, or an east-north-up coordinate system. Three coordinate axes respectively point to the east, the north, and the up direction.

A world coordinate system describes a location relationship on the earth. Common world coordinate systems include a World Geodetic System (WGS)-84 coordinate system, and a Universal Transverse Mercartor (UTM) coordinate system.

Figure 2:
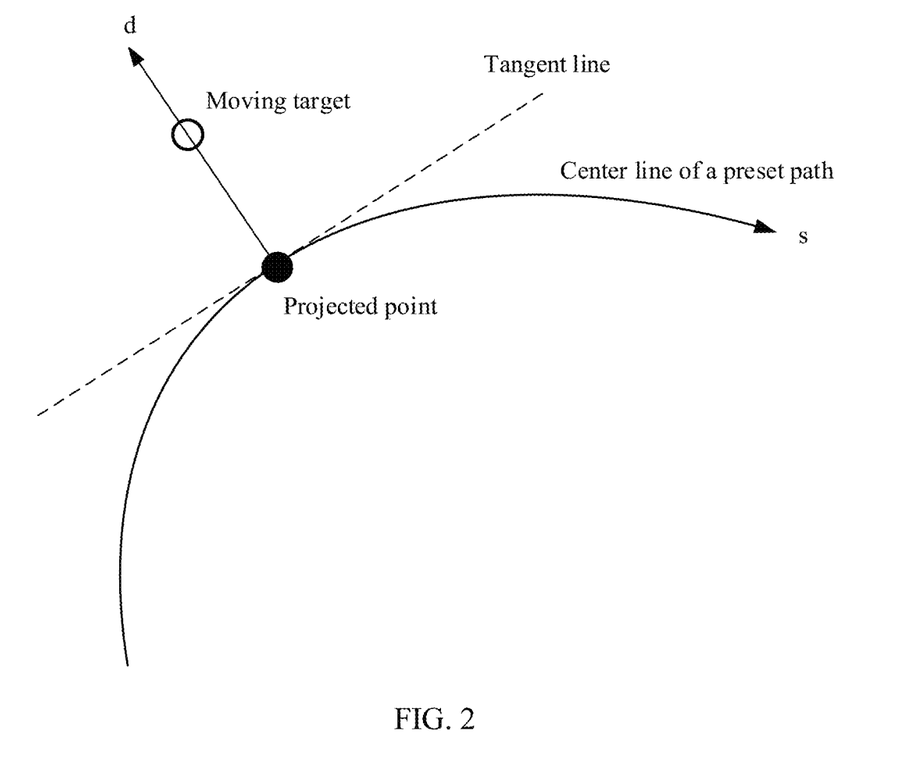
FIG. 2 is a schematic diagram of a Frenet coordinate system according to an embodiment of the present disclosure.

A Frenet coordinate system is defined as follows. As shown in FIG. 2, a center line of a preset path is used as a reference line, an origin of the coordinate system is a reference point on the reference line, an s axis of the coordinate system is a direction in which a moving target moves forward along the reference line, a d axis of the coordinate system is a direction of a connection line between a projection point of the moving target on the reference line and the target, and the connection line between the moving target and the projection point is perpendicular to a tangent line that is to the reference line at the projection point.

Figure 3:
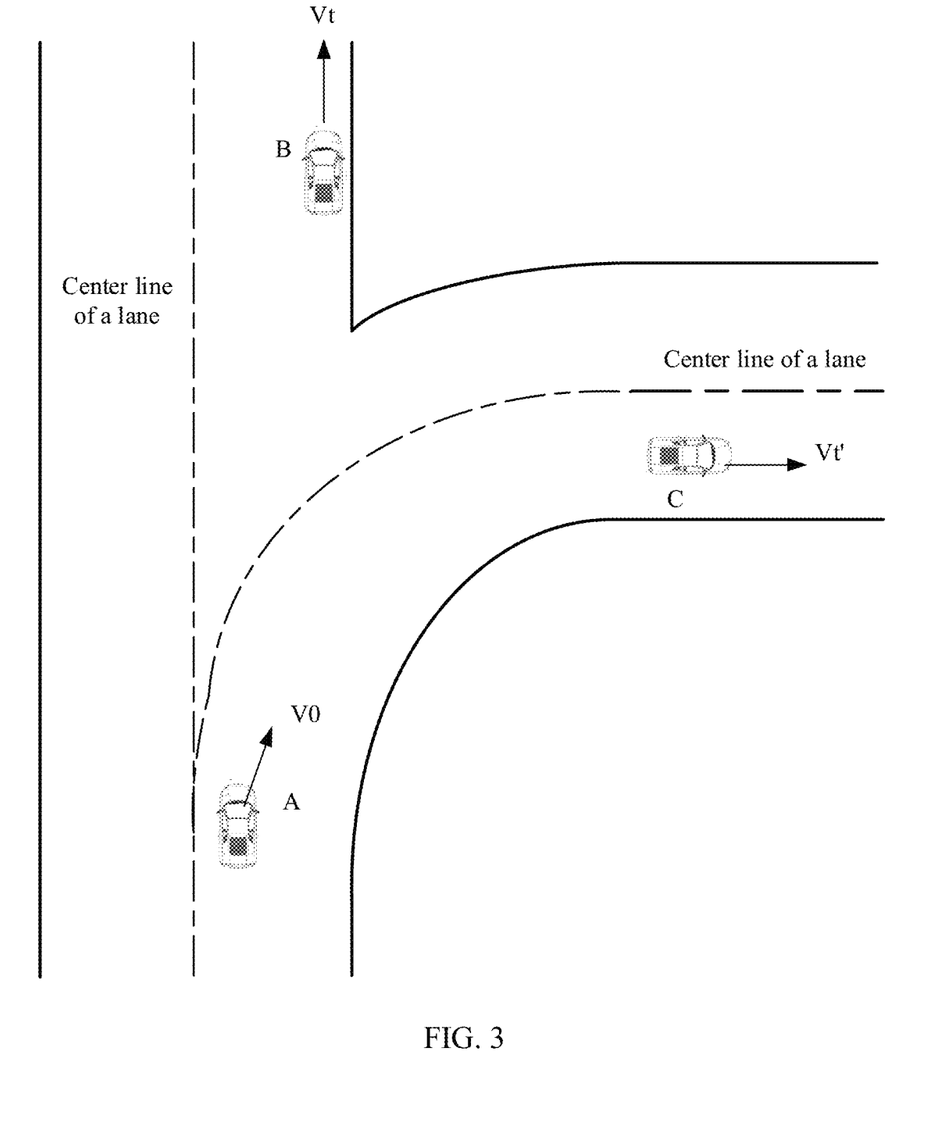
FIG. 3 is a diagram of a typical application scenario (that a motor vehicle is driven on a road is used as an example) according to an embodiment of the present disclosure.

In FIG. 3, a typical application scenario of the embodiments of the present disclosure is described by using an example in which a motor vehicle is driven on a road, but the application scenario of the embodiments of the present disclosure is not limited to the specific case. The embodiments of the present disclosure may be further applied to motion of all moving targets (including a motor vehicle, a non-motor vehicle, a pedestrian, a robot, and the like) on paths in all forms (including an expressway, an urban road, a country road, an indoor path, and the like). Subsequent embodiments are described by using a vehicle or a lane as an example, but a person skilled in the art may extend the embodiments to another field of predicting a moving track of a target. As shown in FIG. 3, at a moment $t_0$, a target vehicle is driven on a right side of a center line of a lane in a location A at a velocity $V_0$ (the velocity in the embodiments of the present disclosure includes a speed and a direction), and the lane is split into two lanes (namely, going straight and turning right) in front. Therefore, there is a high possibility that the target vehicle appears in a location B or a location C at a to-be-predicted moment t, so that there are two parallel possibilities of moving tracks of the target vehicle from the moment $t_0$ to the moment t, namely, going straight (driving from the location A to the location B) or turning right (driving from the location A to the location C).

Figure 4:
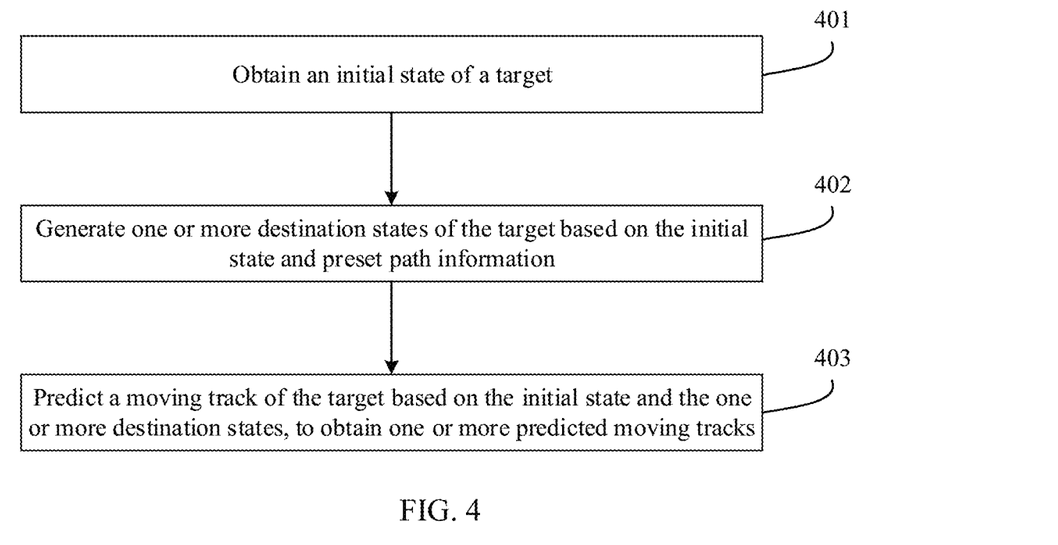
FIG. 4 is a flowchart of a moving track prediction method according to embodiment 1 of the present disclosure.

FIG. 4 is a flowchart of an embodiment of a moving track prediction method according to the present disclosure. As shown in FIG. 4, the moving track prediction method includes step 401, step 402, and step 403.

Step 401. Obtain an initial state of a target. The target includes a pedestrian, a motor vehicle, or a non-motor vehicle, and may further include another moving target. Original data of environment detection is obtained by using one or more target detection sensors (for example, a camera, a laser radar, or a millimeter-wave radar), and then a sensing result of the target, including motion state-related information such as a location, a velocity, acceleration, or an angular velocity, is obtained by using a target detection and tracing algorithm. Because a coordinate system (a common coordinate system, for example, is a sensor coordinate system or a vehicle coordinate system) on which the sensing result of the target obtained by the target detection sensor is based usually is different from a coordinate system (a common coordinate system, for example, is a topocentric coordinate system or a world coordinate system) on which preset path information is based, step 401 includes a coordinate transformation operation of projecting the sensing result of the target onto the coordinate system on which the preset path information is based, to obtain the initial state of the target that is based on the coordinate system the same as that of the preset path information. The initial state of the target includes an initial location and an initial motion state, and the initial motion state includes a velocity, acceleration, an angular velocity, or angular acceleration.

Step 402. Generate one or more destination states of the target based on the initial state and the preset path information. The preset path information may be information in a form of a road structure, a road sign indication, a map, or the like. The destination state includes at least a destination location, and may further include a destination motion state such as a velocity, acceleration, an angular velocity, or angular acceleration. Moving track prediction is performed with reference to the destination location and the destination motion state, so that prediction precision can be further improved.

Step 402 includes determining, based on the initial location information in the initial state of the target and the preset path information, one or more preset paths associated with the target. Further, a case shown in FIG. 3 is used as an example. Preset path information in a form of a street map or the like is searched for based on an initial location that is of a target vehicle at a moment $t_0$, to obtain a lane that corresponds to the target vehicle at the moment $t_0$ and a center line of the lane. The lane and the center line of the lane are a preset path related to the target vehicle in FIG. 3.

Figure 5:
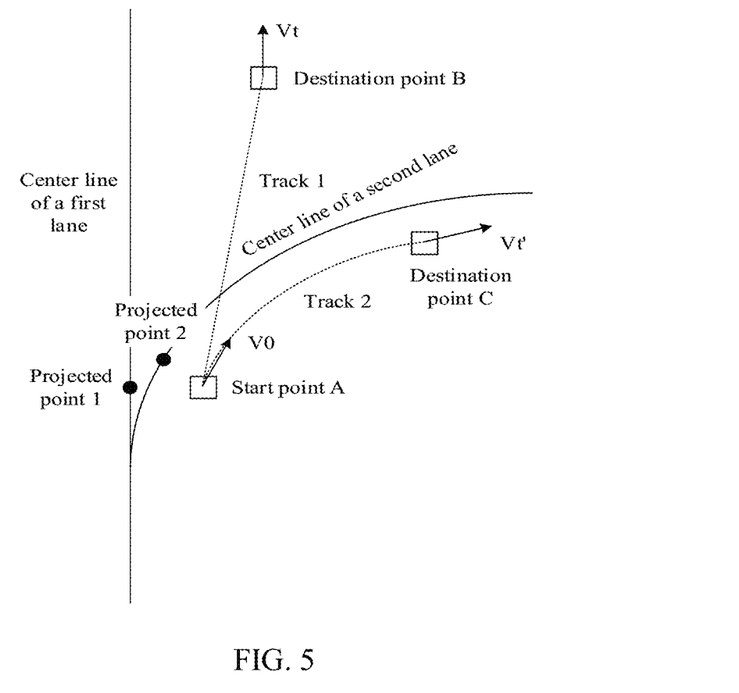
FIG. 5 is a schematic diagram of a case in which one target corresponds to a plurality of preset paths according to embodiment 1 of the present disclosure.

It should be noted that because the target generally is an object having a shape, one target may correspond to a plurality of lanes. FIG. 5 is a schematic diagram of a case in which one target corresponds to a plurality of preset paths, and this case corresponds to an application scenario in which a motor vehicle is driven on a road in FIG. 3. A start point A is the initial location of the target vehicle, a velocity $V_0$ is an initial motion state of the target vehicle, and the initial location and the initial motion state are included in an initial state of the target vehicle. Because at the initial moment $t_0$, the target vehicle is located on a lane on which a first lane and a second lane overlap, a center line of the first lane and a center line of the second lane may be used as a plurality of preset paths associated with the target vehicle. In another scenario, one preset path closest to the initial location of the moving target may be selected as an associated preset path, or a plurality of preset paths may be selected as associated preset paths, where a distance between the moving target and each of the preset paths is within a specified threshold, or a specified quantity of preset paths closest to the moving target may be selected as associated preset paths, or one or more preset paths that best match a moving direction (for example, a direction of the velocity, a direction of the acceleration, or a direction of the angular acceleration) of the moving target may be selected as associated preset paths. When the plurality of preset paths associated with the target are selected, a probability of a destination state corresponding to each associated preset path may be obtained by calculating a probability of the associated preset path, and the probability of the destination state is used to calculate a probability of a predicted moving track, to provide a reference for making a more accurate planning and control decision subsequently.

Step 402 further includes establishing one or more Frenet coordinate systems based on the selected one or more preset paths, and generating the one or more destination states in the one or more Frenet coordinate systems based on the initial state of the target and a motion model.

A case in which one target corresponds to a plurality of associated preset paths in FIG. 5 is used as an example. The start point A of the initial location of the target is separately projected onto the center line of the first lane and the center line of the second lane, to obtain a projected point 1 and a projected point 2 of the initial location. Two Frenet coordinate systems are established respectively along the center lines of the lanes by using the projected point 1 and the projected point 2 as origins and using directions of the center line of the first lane and the center line of the second lane as s directions. Then, s components of the start point A in the two Frenet coordinate systems are 0, and d components are determined respectively based on a distance between the start point A and the projected point 1 and a distance between the start point A and the projected point 2. Two destination states are generated respectively in the two Frenet coordinate systems based on the initial state of the target vehicle and the motion model. The two destination states respectively correspond to the two associated preset paths (namely, the center line of the first lane and the center line of the second lane) that are selected previously, a destination state corresponding to the center line of the first lane is a destination point B and a velocity $V_t$, and a destination state corresponding to the center line of the second lane is a destination point C and a velocity $V_t'$.

The initial location and an initial velocity of the target are projected onto a same Frenet coordinate system. As described above, an s axis of the Frenet coordinate system is a direction in which the target moves forward along an associated preset path (for example, the center line of the first lane or the center line of the second lane in FIG. 5), a d axis of the coordinate system is a direction of a connection line between the projected point of the target on the associated preset path and the target, and the connection line between the target and the projected point is perpendicular to a tangent line that is to the associated preset path at the projected point. The projected point is used as an origin, an initial location of the target at a moment 0 is $P_0$ (components of $P_0$ on the s axis and the d axis are respectively $P_{0S}$ and $P_{0d}$), an initial velocity of the target is $V_0$ (components of $V_0$ on the s axis and the d axis are respectively $V_{0S}$ and $V_{0d}$), a to-be-predicted destination location of the target at a moment T is $P_T$ (components of $P_T$ on the s axis and the d axis are respectively $P_{TS}$ and $P_{Td}$), and a destination velocity of the target is $V_T$ (components of $V_T$ on the s axis and the d axis are respectively $V_{TS}$ and $V_{Td}$). The following describes, by using two examples, how to calculate the destination state by using the initial state and the motion model 1. If motion models used on the s axis and the d axis are respectively a uniform motion model and a uniformly retarded motion model, and it is assumed that a direction of a velocity of the target at the moment T is parallel to the associated preset path, a to-be-predicted destination state at the moment T is:

Because the target moves on the s axis at a constant velocity $V_{0S}$, $P_{TS}=V_{0S} \times T$;

Because the target makes uniformly retarded motion on the d axis, $P_{Td}=P_{0d}-0.5 \times V_{0d} \times T$;

Because the target moves on the s axis at a constant velocity $V_{0S}$, $V_{TS}=V_{0S}$; and Because the direction of the velocity of the target at the moment T is parallel to the associated preset path, and the d axis is perpendicular to the associated preset path, $V_{Td}=0$.

2. If motion models used on the s axis and the d axis are respectively a uniformly accelerated motion model and a uniform motion model, and it is assumed that acceleration of the target is a, a to-be-predicted destination state at the moment T is:

$$P_{TS} = 0.5 \times V_{0S} \times T + 0.5 \times aT^2;$$

$$P_{Td} = P_{0d} - V_{0d} \times T;$$

$$V_{TS} = V_{0S} + aT; \text{ and}$$

$$V_{Td} = V_{0d}.$$

It can be learned from the foregoing that one target may be associated with a plurality of preset paths, corresponding to a plurality of Frenet coordinate system, and a plurality of corresponding destination states are generated. In this case, a probability of each destination state further needs to be generated based on an initial state of the target. For the case in FIG. 5 of the specification, probabilities of a destination location B and a destination location C may be separately generated, and the two probabilities and the two destination states are provided for a path planning and control module, to better assist in making a planning and control decision. Alternatively, a destination state having a higher probability may be determined based on the foregoing two probabilities, and only the destination state having a higher probability is provided for the path planning and control module.

To further improve track prediction precision, a parameter obtained after model training is further used during step 402 of "generating the one or more destination states of the target based on the initial state and the preset path information". Model training means that a parameter of a model is determined by using existing sample data and by using some methods. The following describes, by using three examples, how to use the parameter obtained after model training in this embodiment.

1. The parameter obtained after model training is used to select one or more preset paths associated with the target.

For selection of a lane associated with the target, a multi-classifier model may be established with reference to a distance between the initial location of the target and each lane and an included angle between a direction of the initial velocity and a lane line, and a probability corresponding to each lane may be obtained by using an algorithm such as softmax, boosting, or a decision tree. The softmax is used as an example, and the following model is established based on the distance between the initial location of the target and each lane and the included angle between the direction of the initial velocity and the lane line:

$$w = alpha1 \times d_0 + alpha2 \times \Delta h_0, \text{ and}$$

$$p_j = \exp(-w_j) / \left( \sum\nolimits_i \exp(-w_i) \right),$$

where w is a weight used to calculate a probability that the target is associated with a corresponding lane, $d_0$ is a distance between the initial location of the target and the lane (namely, a distance between a projection of the initial location of the target on a center line of the lane and the initial location of the target), $\Delta h_0$ is an included angle between the direction of the initial velocity of the target and an orientation of the center line of the lane, alpha1 and alpha2 are parameters obtained after model training, $p_j$ is a probability that the target is associated with a lane j, j is an integer, $w_i$ is a weight of a probability that the target is associated with a lane i, and all lanes need to be traversed for i.

2. The parameter obtained after model training is used to calculate a destination location of the target.

A d component of the destination location in a Frenet coordinate system is used as an example, and the following displacement attenuation model may be constructed:

$$d_f = \exp(-alpha \times 1 - beta)(d_0),$$

where l is a length of a predicted track, and depends on an s component of the destination location in the Frenet coordinate system, $d_0$ is a d component of the initial location in the Frenet coordinate system, alpha and beta are parameters obtained after model training, and the parameters may be trained through linear regression.

3. The parameter obtained after model training is used to calculate the destination velocity of the target.

A d component of the destination velocity in a Frenet coordinate system is used as an example, and the following displacement attenuation model may be constructed:

$$V_f = \exp(-\text{alpha} \times 1 - \text{beta})(v_0),$$

where l is a length of a predicted track, and depends on an s component of the destination location in the Frenet coordinate system, $v_0$ is a d component of the initial velocity in the Frenet coordinate system, alpha and beta are parameters obtained after model training, and the parameters may be trained through linear regression.

Step 403. Predict a moving track of the target based on the initial state and the one or more destination states, to obtain one or more predicted moving tracks. When there is a plurality of destination states, a probability of each of the plurality of predicted moving tracks may be obtained based on a probability of each destination state determined in step 402, or a moving track of the target may be predicted with reference to the initial state and based only on a destination state having a highest probability, to predict a moving track having a highest probability. The one or more predicted moving tracks and the probability thereof may be provided for a vehicle path planning module or another control module, to provide a reference for making a more accurate planning and control decision subsequently. Further, the path planning module may perform a necessary avoidance operation based on a predicted track of the target vehicle, to avoid a collision. For example, for a target vehicle on a left lane or a right lane adjacent to the lane of the vehicle, when a predicted track of the target vehicle occupies the lane of the vehicle, and collides with a planned path that is of the vehicle at a current moment, a planned path and a planned velocity of the vehicle are adjusted based on locations that are on the planned path of the vehicle and that are occupied by predicted future moving tracks of the target vehicle at different moments and occupation degrees, to perform avoidance by decreasing the planned velocity or deviating from the planned path.

Step 403 includes the following.

Step 403a. Draw a moving track of the target in the Frenet coordinate system based on the initial state and the destination state of the target in the Frenet coordinate system. Further, a smooth curve may be fit in a Cubic Hermite Spline interpolation manner, to be used as the track in the Frenet coordinate system, or a final track in the Frenet coordinate system may be obtained by using a proportional-integral-derivative (PID) controller based on the smooth curve.

Figure 6:
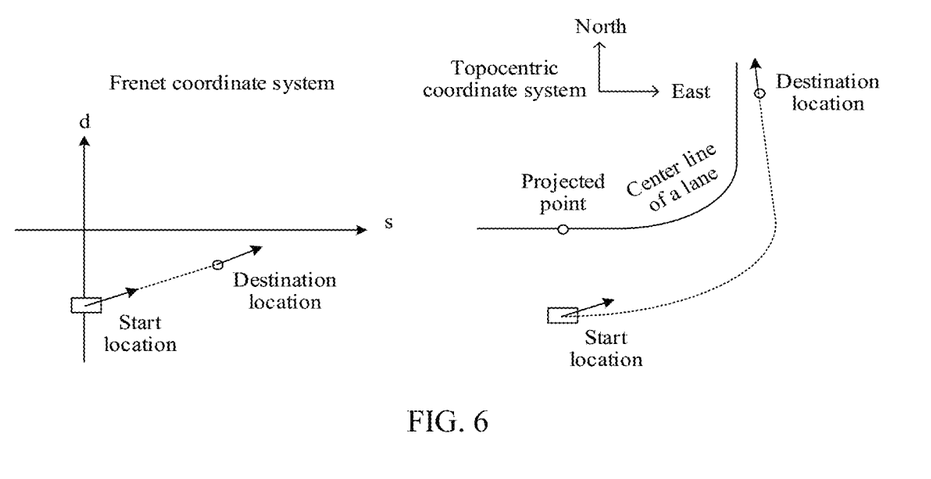
FIG. 6 is a schematic diagram of transforming a moving track of a target from a Frenet coordinate system to a topocentric coordinate system according to embodiment 1 of the present disclosure.

Step 404b. Transform the one or more predicted moving tracks in the Frenet coordinate system for use in a coordinate system used to plan and control motion of a target, where the coordinate system used to plan and control motion of a target includes a vehicle coordinate system, a topocentric coordinate system, or a world coordinate system. FIG. 6 is a schematic diagram of transforming the moving track of the target from the Frenet coordinate system to the topocentric coordinate system. A dashed line is a predicted track line. A destination location in the Frenet coordinate system has some displacements on the s axis and the d axis of the Frenet coordinate system relative to the start location. It can be learned from meanings of the s axis and the d axis of the Frenet coordinate system that for the topocentric coordinate system, the displacements are represented as follows. On one hand, the moving target moves forward in an extension direction of the center line of the lane on which the Frenet coordinate system is based, on the other hand, the moving target moves closer to the center line of the lane.

It can be learned from this embodiment that in this embodiment of the present disclosure, both the initial state of the target and the preset path information are used. The destination state is generated by using the motion model in the Frenet coordinate system that is based on the center line of the lane, and the predicted track is generated with reference to the initial state and the destination state of the target. Compared with a conventional track prediction method based only on an initial state, this embodiment better conforms to an actual moving scenario of a moving target especially a target vehicle, and a predicted track has higher accuracy.

Figure 7:
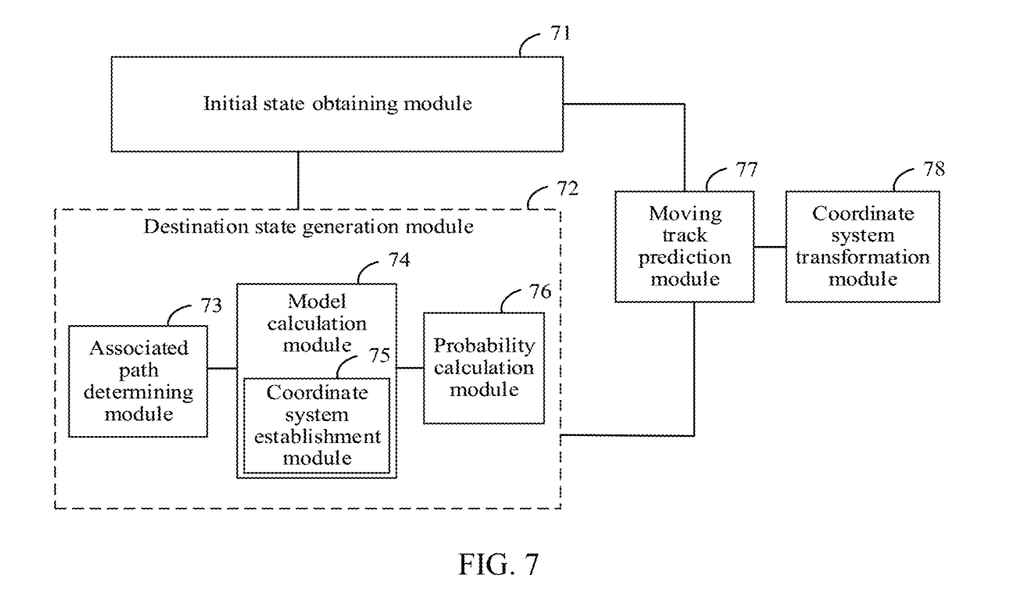
FIG. 7 is a structural block diagram of a moving track prediction apparatus according to embodiment 2 of the present disclosure.

FIG. 7 is a structural block diagram of a moving track prediction apparatus according to Embodiment 2 of the present disclosure. As shown in FIG. 7, the moving track prediction apparatus includes an initial state obtaining module 71 configured to obtain an initial state of a target, where the initial state includes an initial location and an initial motion state, and a destination state generation module 72 configured to generate one or more destination states of the target based on the initial state and preset path information, where the destination state includes at least a destination location.

The destination state generation module 72 further includes an associated path determining module 73 configured to determine, based on the initial location and the preset path information, one or more preset paths associated with the target, a model calculation module 74 configured to generate the one or more destination states based on the initial state and a motion model, where the one or more destination states correspond to the one or more preset paths, and a probability calculation module 76 configured to, when there are a plurality of destination states, generate a probability of each destination state based on the initial state of the target and the preset path information, where the probability of each destination state is used to obtain a probability of each of the plurality of predicted moving tracks.

The model calculation module 74 further includes a coordinate system establishment module 75 configured to establish one or more Frenet coordinate systems based on the one or more preset paths. The one or more destination states are generated by the model calculation module respectively in the one or more Frenet coordinate systems based on the initial state of the target and the motion model.

The moving track prediction apparatus further includes a moving track prediction module 77 configured to predict a moving track of the target based on the initial state and the one or more destination states, to obtain one or more predicted moving tracks, and a coordinate system transformation module 78 configured to transform the one or more predicted moving tracks for use in a coordinate system used to plan and control motion of a target, where the coordinate system used to plan and control motion of a target includes a vehicle coordinate system, a topocentric coordinate system, or a world coordinate system.

One or more of the modules in FIG. 7 may be implemented by software, hardware, firmware, or a combination thereof. The software or firmware includes but is not limited to a computer program instruction or code, and may be executed by a hardware processor. The hardware includes but is not limited to various integrated circuits such as a central processing unit (CPU), a digital signal processor (DSP), a field-programmable gate array (FPGA), or an application-specific integrated circuit (ASIC).

Figure 8:
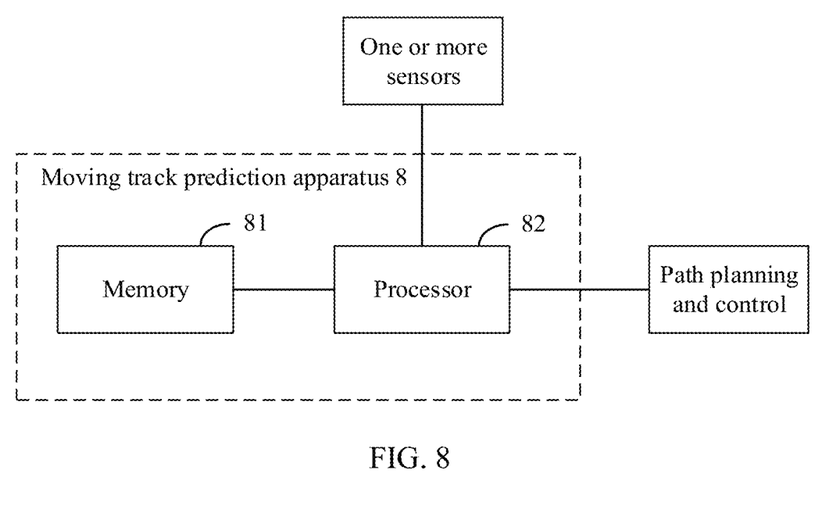
FIG. 8 is a structural block diagram of a moving track prediction apparatus according to embodiment 3 of the present disclosure.

FIG. 8 is a structural block diagram of a moving track prediction apparatus according to embodiment 3 of the present disclosure. As shown in FIG. 8, a moving track prediction apparatus 8 includes a memory 81 and a processor 82. The memory 81 stores a computer program instruction. The processor 82 runs the computer program instruction to perform operations related to moving track prediction in embodiment 1. The processor 82 is further connected to one or more external sensors of the moving track prediction apparatus 8, to receive original data that is of surroundings of a vehicle and that is detected by the sensor. The sensor includes but is not limited to a camera, a laser radar, an ultrasonic radar, or a millimeter wave radar. A track prediction result of a target output by the moving track prediction apparatus 8 generally is sent to a path planning and control module of an intelligent driving vehicle, to provide reference information for controlling the vehicle. The path planning and control module may be a software module executed by the processor 82 or integrated into the processor 82. This is not limited in this embodiment. The processor 82 includes but is not limited to various CPUs, a DSP, a microcontroller, a microprocessor, or an artificial intelligence processor.

According to the moving track prediction apparatus shown in FIG. 7 or FIG. 8, preset path information is introduced, so that a predicted track of a target moving object is limited by the preset path information, which better conforms to an actual moving scenario of a moving target especially a target vehicle. In addition, a destination state is generated by using an initial state of the target and a motion model in a Frenet coordinate system that is based on an associated preset path, and a predicted track of the target is generated based on the initial state and the destination state in the Frenet coordinate system, so that motion of the target and the preset path information are effectively combined, thereby greatly improving precision and reliability of track prediction of the target.

A person skilled in the art will clearly understand that mutual reference may be made to descriptions of the embodiments provided in the embodiments of this disclosure. For ease and brevity of description, for example, for functions of and steps performed by the apparatuses and the devices provided in the embodiments of this disclosure, refer to related description of the method embodiment of the present disclosure, and mutual reference may be made to the method embodiments and the apparatus embodiments.

A person skilled in the art will understand that all or some of the steps of the method embodiments may be implemented by using hardware related to a program instruction. The program may be stored in a computer-readable storage medium. When the program is run, the steps of the method embodiments are performed. The foregoing storage medium includes various media that can store program code, such as a read-only memory (ROM), a random-access memory (RAM), a magnetic disk, or an optical disc.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

In the several embodiments provided in this disclosure, it should be understood that the disclosed system, apparatus, and method may be implemented in other manners without departing from the scope of this disclosure. For example, the described embodiment is merely an example. For example, division into the modules or units is merely logical function division and may be other division in an actual implementation. For example, a plurality of units or components may be combined or integrated into another system, or some features may be ignored or not performed. The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments. A person of ordinary skill in the art would understand and implement the embodiments of the present disclosure without creative efforts.

In addition, the schematic diagrams illustrating the system, apparatus, method, and different embodiments may be combined or integrated with other systems, modules, technologies or methods without departing from the scope of the present disclosure. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
obtaining, by one or more target detection sensors, an initial state of a moveable target, wherein the initial state comprises an initial location and an initial motion state;

obtaining, by a destination state generator using a model training algorithm comprising a softmax function, a parameter;

generating one or more destination states of the target based on the parameter, the initial state and preset path information, wherein each of the one or more destination states comprises a destination location;

predicting, based on the initial state and the one or more destination states, a moving track of the target to obtain one or more predicted moving tracks; and controlling, with reference to the one or more predicted moving tracks, the target.

2. The method of claim 1, further comprising:

determining, based on the initial location and the preset path information, one or more preset paths associated with the target; and further generating, based on a motion model, the one or more destination states corresponding to the one or more preset paths.

3. The method of claim 2, further comprising:

establishing one or more Frenet coordinate systems based on the one or more preset paths; and further generating the one or more destination states respectively in the one or more Frenet coordinate systems.

4. The method of claim 1, further comprising:

generating, based on the initial state and preset path information, a first probability of each of a plurality of destination states; and obtaining, based on the first probability of each of the destination states, a second probability of each of the one or more predicted moving tracks.

5. The method of claim 1, wherein each of the one or more destination states further comprises a destination motion state, and wherein the destination motion state comprises at least one of a velocity, an acceleration, an angular velocity, or an angular acceleration.

6. The method of claim 1, wherein the initial motion state comprises at least one of a velocity, an acceleration, an angular velocity, or an angular acceleration.

7. An apparatus comprising:

a memory configured to store instructions; and a processor coupled to the memory, wherein the instructions cause the processor to be configured to:

obtain, from one or more target detection sensors, an initial state of a moveable target, wherein the initial state comprises an initial location and an initial motion state;

obtain, by a destination state generator using a model training algorithm comprising a boosting function, a parameter;

generate one or more destination states of the target based on the parameter, the initial state and preset path information, wherein each of the one or more destination states comprises a destination location;

predict, based on the initial state and the one or more destination states, a moving track of the target to obtain one or more predicted moving tracks; and control, with reference to the one or more predicted moving tracks, the target.

8. The apparatus of claim 7, wherein the instructions further cause the processor to be configured to:

determine, based on the initial location and the preset path information, one or more preset paths associated with the target; and further generate, based on a motion model, the one or more destination states corresponding to the one or more preset paths.

9. The apparatus of claim 8, wherein the instructions further cause the processor to be configured to:

establish one or more Frenet coordinate systems based on the one or more preset paths; and further generate the one or more destination states respectively in the one or more Frenet coordinate systems.

10. The apparatus of claim 7, wherein the instructions further cause the processor to be configured to:

generate, based on the initial state and the preset path information, a first probability of each of a plurality of destination states; and obtain, based on the first probability of each destination state, a second probability of each of the one or more predicted moving tracks.

11. The apparatus of claim 7, wherein each of the one or more destination states further comprises a destination motion state, and wherein the destination motion state comprises at least one of a velocity, an acceleration, an angular velocity, or an angular acceleration.

12. The apparatus of claim 7, wherein the initial motion state comprises at least one of a velocity, an acceleration, an angular velocity, or an angular acceleration.

13. A computer program product comprising computer-executable instructions that are stored on a non-transitory computer readable medium and that, when executed by a processor, cause an apparatus to:

obtain, with one or more target detection sensors, an initial state of a moveable target, wherein the initial state comprises an initial location and an initial motion state;

obtain, by a destination state generator using a model training algorithm comprising a decision tree, a parameter;

generate one or more destination states of the target based on the parameter, the initial state and preset path information, wherein each of the one or more destination states comprises a destination location;

predict, based on the initial state and the one or more destination states, a moving track of the target to obtain one or more predicted moving tracks; and control, with reference to the one or more predicted moving tracks, the target.

14. The computer program product of claim 13, wherein the computer-executable instructions further cause the apparatus to:

determine, based on the initial location and the preset path information, one or more preset paths associated with the target; and further generate, based on a motion model, the one or more destination states corresponding to the one or more preset paths.

15. The computer program product of claim 14, wherein the computer-executable instructions further cause the apparatus to:

establish one or more Frenet coordinate systems based on the one or more preset paths; and further generate the one or more destination states respectively in the one or more Frenet coordinate systems.

16. The computer program product of claim 13, wherein each of the one or more destination states further comprises a destination motion state, and wherein the destination motion state comprises at least one of a velocity, an acceleration, an angular velocity, or an angular acceleration.

17. The computer program product of claim 13, wherein the initial motion state comprises at least one of a velocity, an acceleration, an angular velocity, or an angular acceleration.

18. The computer program product of claim 13, wherein the computer-executable instructions further cause the apparatus to:
   generate, based on the initial state and the preset path information, a first probability of each of a plurality of destination states; and
   obtain, based on the first probability of each destination state, a second probability of each of the one or more predicted moving tracks.

19. The method of claim 1, wherein the one or more target detection sensors comprise a laser radar.

20. The apparatus of claim 7, wherein the one or more target detection sensors comprises a millimeter-wave radar.

* * * * *